United States Patent
Wu

(10) Patent No.: US 7,286,306 B2
(45) Date of Patent: Oct. 23, 2007

(54) PORTABLE MULTIMEDIA BASED AV PLAYER WITH MAGNIFYING LENS

(76) Inventor: Chun-Ming Wu, 4FL-1, No. 218, Dadun 6th St., Nantun District, Taichung City (TW) 408

(*) Notice: Subject to any disclaimer, the term of this patent is extended or adjusted under 35 U.S.C. 154(b) by 0 days.

(21) Appl. No.: 11/387,912

(22) Filed: Mar. 24, 2006

(65) Prior Publication Data
US 2007/0223115 A1    Sep. 27, 2007

(51) Int. Cl.
G02B 3/00    (2006.01)
G02B 27/02    (2006.01)
G06F 1/16    (2006.01)
G06F 19/00    (2006.01)
F16M 11/38    (2006.01)

(52) U.S. Cl. ............... 359/809; 359/802; 361/680; 361/681; 463/31; 248/172

(58) Field of Classification Search ............... 359/800, 359/802, 808–810, 819, 799; 362/85, 109, 362/223, 260; 353/63, 119; 463/6, 31, 33, 463/34, 37; 386/46, 126, 97, 117, 125; 348/779, 348/832, 837, 838; 381/145, 152, 190, 306, 381/333, 345, 386; 361/680, 681, 683, 687; 312/7.2, 248; 248/172, 917
See application file for complete search history.

(56) References Cited

U.S. PATENT DOCUMENTS

| | | | |
|---|---|---|---|
| 4,756,615 A * | 7/1988 | Hildebrand | 353/74 |
| 4,810,087 A * | 3/1989 | Tachibana et al. | 353/79 |
| 5,119,239 A * | 6/1992 | Iaquinto et al. | 359/811 |
| 5,343,262 A * | 8/1994 | Park | 353/119 |
| 5,345,282 A * | 9/1994 | Ushiro et al. | 353/119 |
| 6,052,239 A * | 4/2000 | Matsui et al. | 359/802 |
| 6,417,894 B1 * | 7/2002 | Goff et al. | 348/832 |
| 6,481,866 B2 * | 11/2002 | Naghi et al. | 362/109 |
| 6,648,487 B2 * | 11/2003 | Liao | 362/85 |

* cited by examiner

Primary Examiner—Loha Ben
(74) Attorney, Agent, or Firm—Bacon & Thomas PLLC

(57) ABSTRACT

A portable device includes a body including an L-shaped first member including a battery compartment, and a second member hingedly coupled to rear of the first member, the second member including a projection adapted to secure to an AV player, and a well for receiving a plug; a speaker assembly in the first member; a cable interconnected the speaker assembly and the plug, and a magnifying lens mounted on an opening of the first member and having an elevation substantially the same as a screen of the AV player. The plug is adapted to pull out of the well to electrically connect to the AV player. The magnifying lens is adapted to magnify images shown on the screen by 140% to 150% when a distance between the magnifying lens and the AV player is in the range of 40 mm to 50 mm with a TV-distortion less than 1%.

4 Claims, 9 Drawing Sheets

PORTABLE MULTIMEDIA BASED AV PLAYER WITH MAGNIFYING LENS

BACKGROUND OF THE INVENTION

1. Field of Invention

The present invention relates to multimedia based audio/video (AV) players and more particularly to a portable device adapted to releasably attach to a multimedia based AV player and having a speaker assembly for amplifying sound and a magnifying lens for magnifying pictures or video shown on the screen of the AV player.

2. Related Art

MP3 players are very popular recently. Also, iPod available from Apple Computer, Inc. is popular. A person may operate an iPod to listen to music or watch pictures or video on its screen. The screen typically has a size of 2.5" due to compactness of iPod. Quality of pictures or video shown on the screen is fairly good. However, a person may experience eye strain after a relatively long period time of watching (e.g., two hours). The eye strain may be worse when the person also watches translated script on the bottom of the screen while a foreign movie is being played.

FIG. 1 shows a conventional digital AV player and FIG. 2 shows a conventional multimedia based AV player. Both prior AV players are equipped with speakers and charging means. However, no means is provided for magnifying pictures or video shown on the screen of either AV player. Also, they are relatively bulky. Thus, a need for improvement exists.

SUMMARY OF THE INVENTION

It is therefore an object of the present invention to provide a portable device comprising a body including a first member of L-section including an upper opening, an intermediate recess, a bottom battery compartment, and a cover for sealing the compartment, and a second member hingedly coupled to a rear of a horizontal portion of the first member, the second member including a top projection and a well; an AV player including a bottom slot adapted to receive the projection so as to upright fasten the AV player on the second member, a jack, and a screen; a speaker assembly provided in the recess; a plug adapted to receive in the well in an inoperative position and including a cable extended to connect to the speaker assembly, the plug is adapted to pull out of the well and insert into the jack; and a magnifying lens mounted on the opening and having an elevation substantially the same as the screen; wherein the magnifying lens is adapted to magnify images shown on the screen by about 140% to about 150% when a distance between the magnifying lens and the AV player is in the range of about 40 mm to about 50 mm with a TV-distortion less than 1%.

In one aspect of the present invention the magnifying lens has a focal length of about 150 mm to about 200 mm.

In another aspect of the present invention the magnifying lens is formed of an optical glass of high refractive index, low dispersion and is coated with a multi-layer of anti-reflective material.

In a further aspect of the present invention the magnifying lens is formed of PMMA (polymethylmethacrylate) in an injection molding process and has a non-spherical shape.

The above and other objects, features and advantages of the present invention will become apparent from the following detailed description taken with the accompanying drawings.

DETAILED DESCRIPTION OF THE INVENTION

Figure 1:
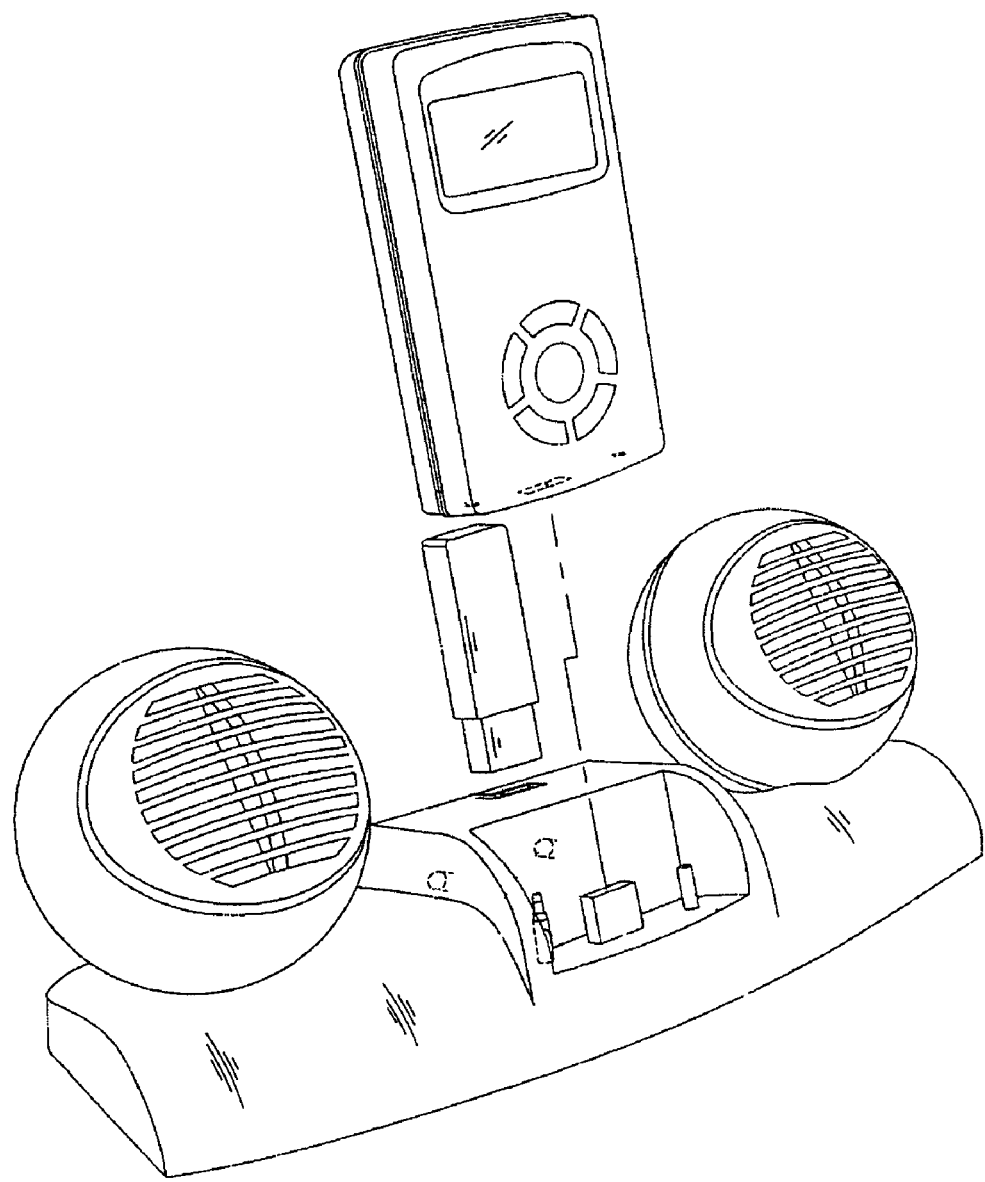
FIG. 1 is an exploded perspective view of a conventional digital AV player.
Figure 2:
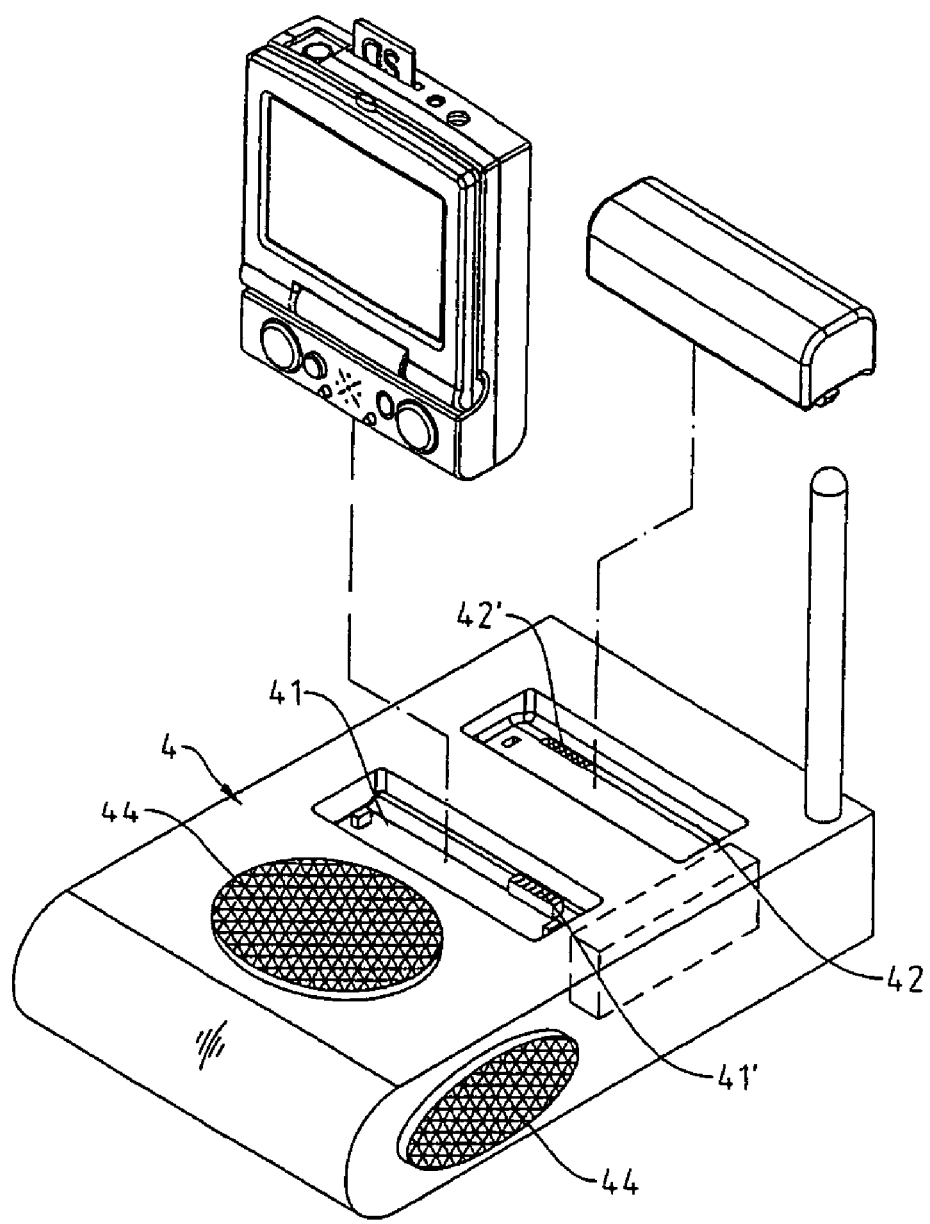
FIG. 2 is an exploded perspective view of a conventional multimedia based AV player.
Figure 3:
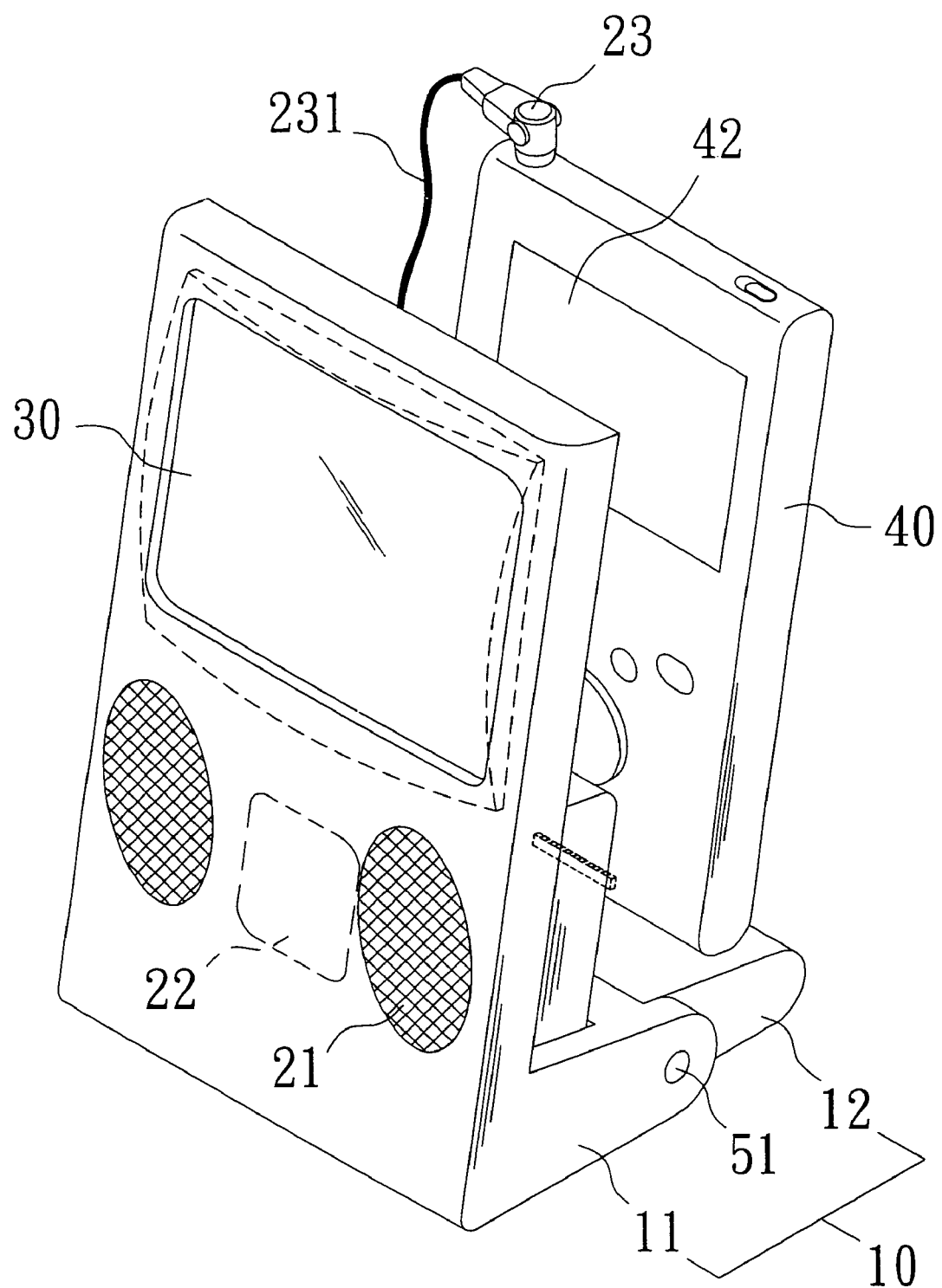
FIG. 3 is a perspective view of a preferred embodiment of AV player according to the invention.
Figure 4:
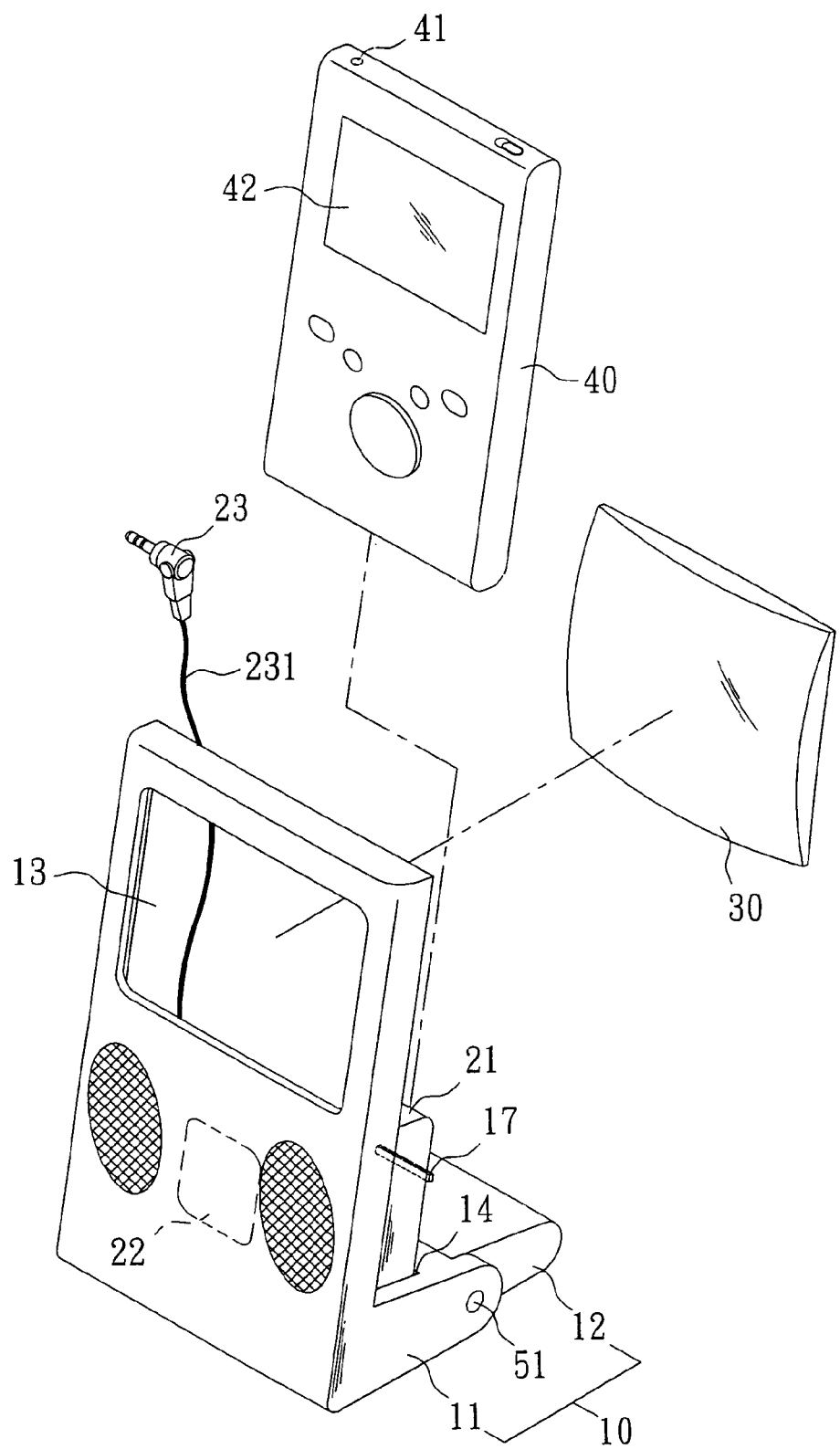
FIG. 4 is an exploded perspective view of the AV player in FIG. 3.
Figure 5:
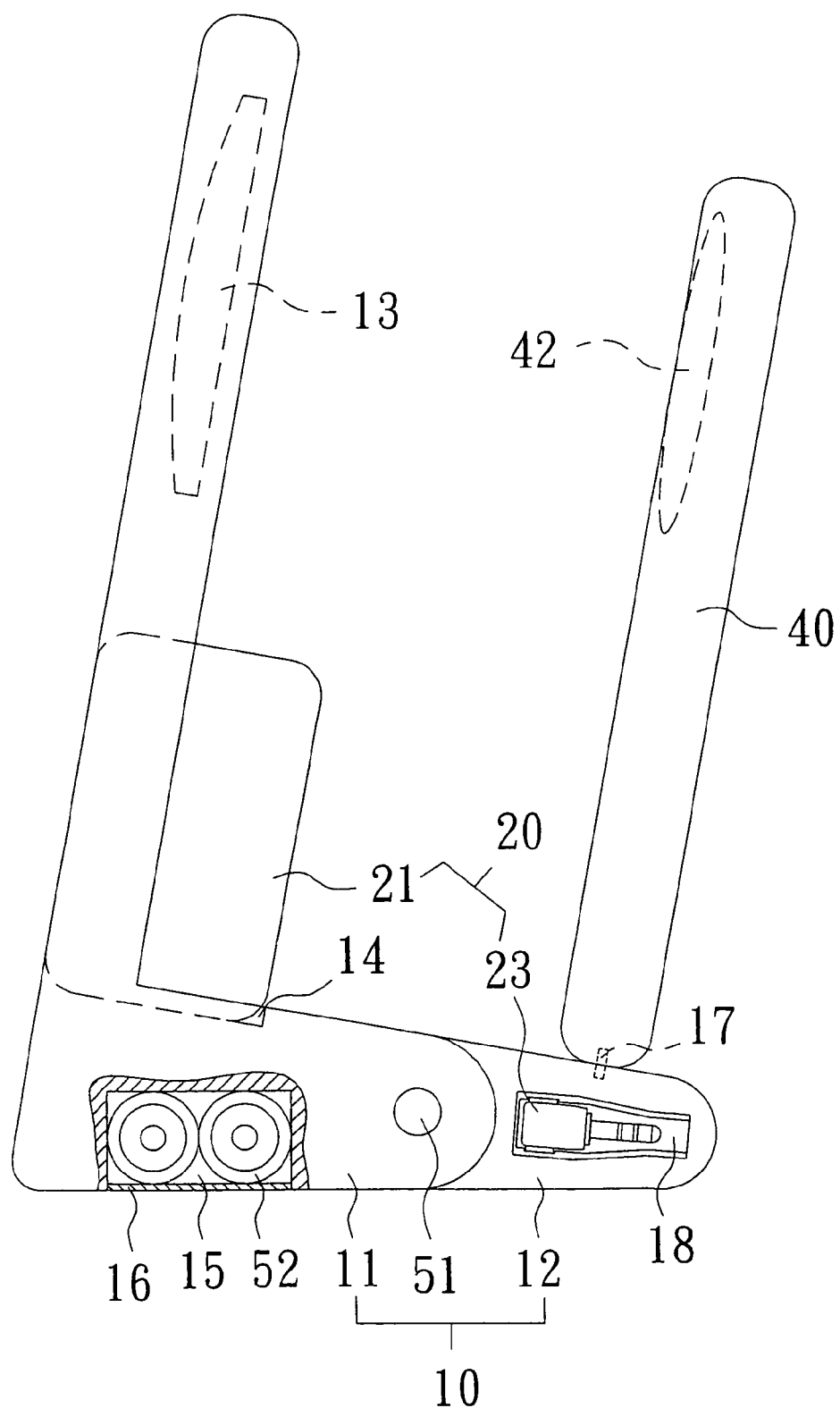
FIG. 5 is a side elevational view of FIG. 3 in part section.

Referring to FIGS. 3 to 9, a device according to a preferred embodiment of the invention is shown. The device comprises a body 10 including a first member 11 of L-section including an upper rectangular opening 13, an intermediate recess 14, a bottom cavity 15 as battery compartment for receiving a plurality of batteries, and a cover 16 for sealing the cavity 15, and a second member 12 hingedly coupled to a rear of the horizontal portion of the first member 11 by a pin 51, the second member 12 including a top projection 17 (see FIG. 5) and a well 18 open to its left.

The device further comprises a rectangular-shaped AV player 40 including a bottom slot (not shown) for snugly receiving the projection 17 so as to upright fasten the AV player 40 on the second member 12, a top jack 41, and a screen 42. The projection 17 may be additionally served as an electrical contact for charging the AV player 40. Thus, a connector (not shown) formed in the body 10, connected to the contact, and adapted to electrically connect to an external charger (not shown) is required. This is well known in the art and a detailed description thereof is therefore deemed unnecessary.

Figure 6:
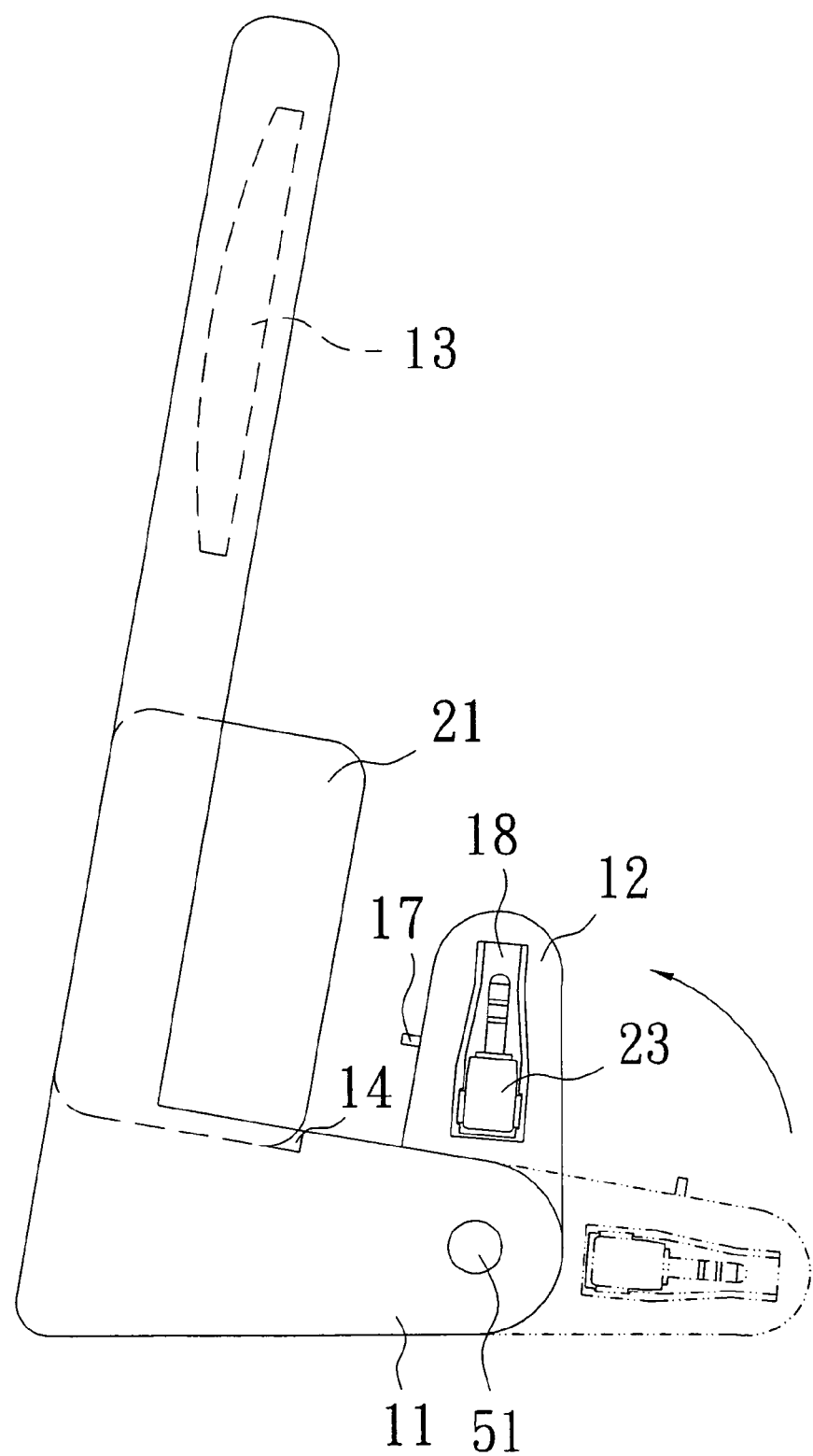
FIG. 6 is a view similar to FIG. 5 with the AV player removed and the second member pivoted to an upright position.
Figure 7:
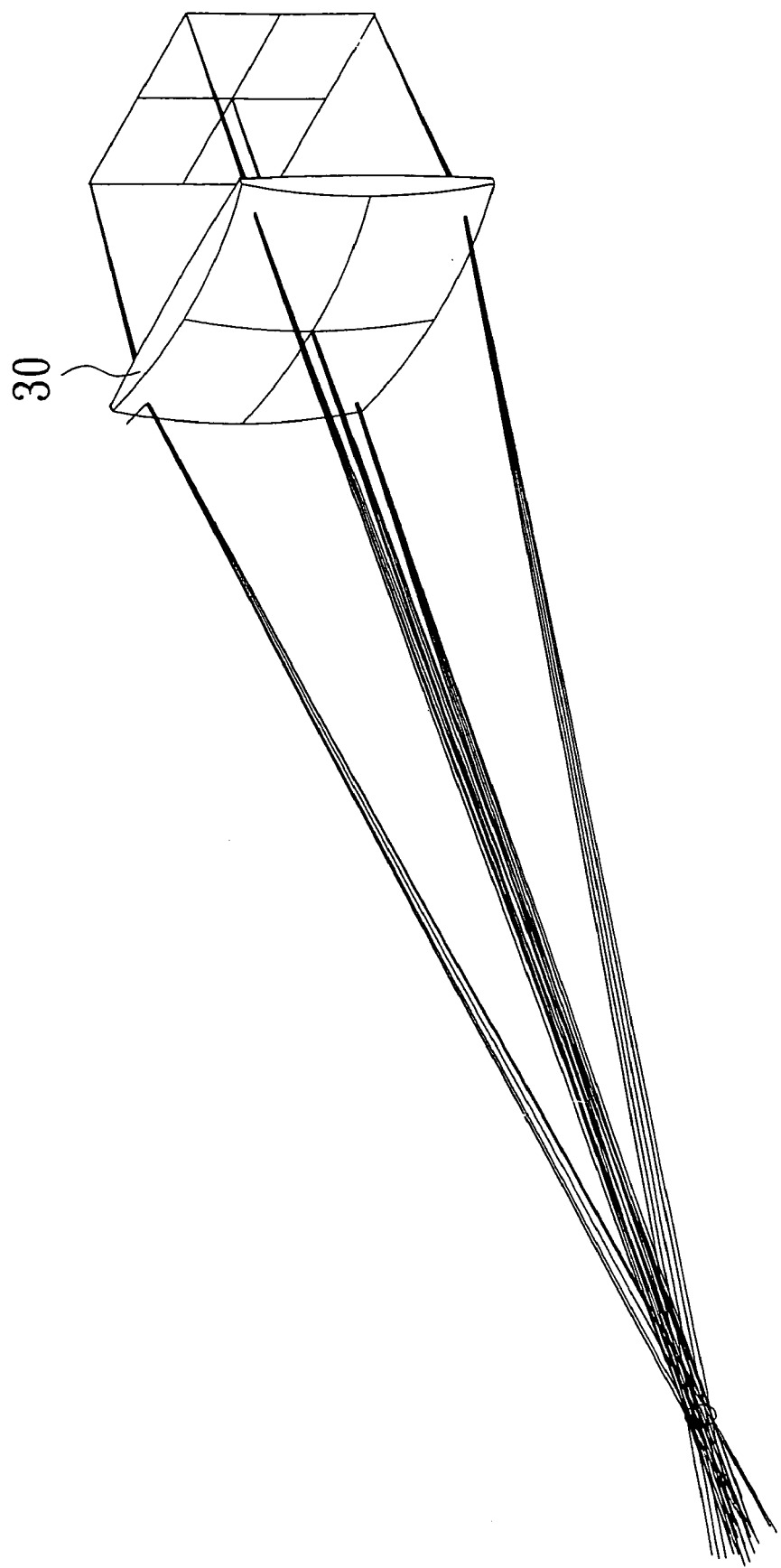
FIG. 7 is a perspective view showing the magnifying lens magnifying the 2.5" screen to 3.5" screen by means of schematic rays.
Figure 8:
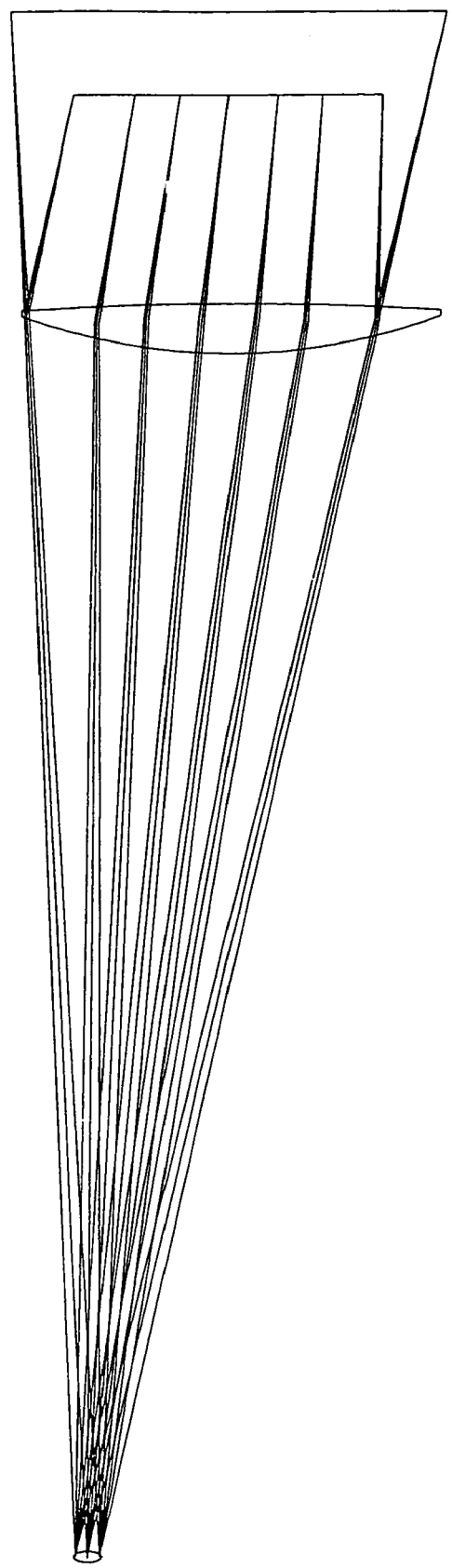
FIG. 8 is a side elevational view of FIG. 7 showing no distortion of the screen after being magnified 140% by the magnifying lens by means of schematic oblique rays.
Figure 9:
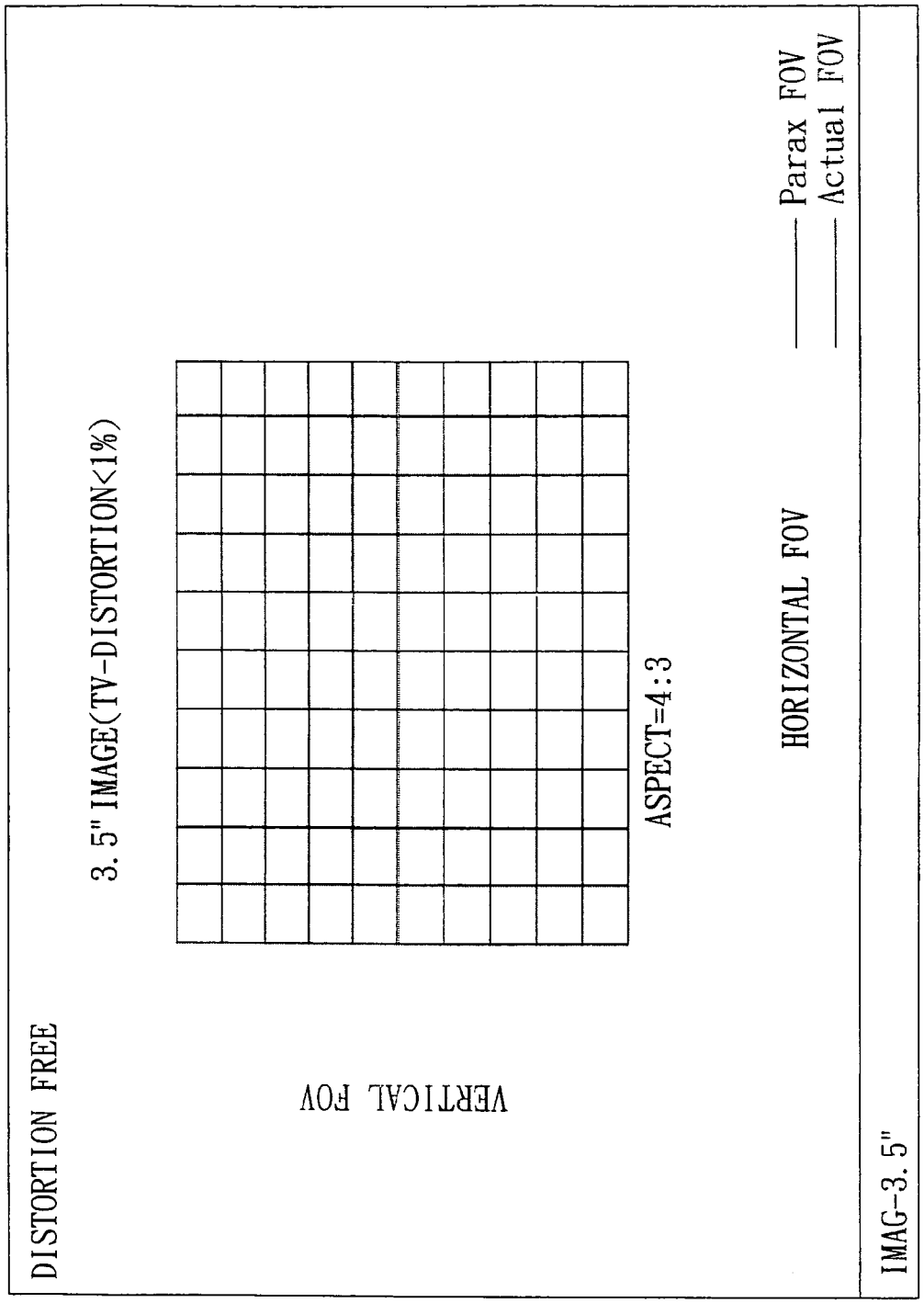
FIG. 9 is a chart showing the magnifying lens having an optimum curvature for minimizing TV-distortion.

As shown in FIG. 6, the second member 12 may be pivoted about the pin 51 to dispose about perpendicular to the horizontal portion of the first member 11 after removing the AV player 40. This can decrease the size of the device so as to facilitate storage or carrying.

The device further comprises a speaker assembly 20 including two speakers 21 provided at both sides of the recess 14, an amplifier 22 provided between the speakers 21, a plug 23 adapted to receive in the well 18 in an inoperative position, and a cable 231 interconnected the plug 23 and the amplifier 22. The cable 231 has a sufficient length so that in use a user may pull the plug 23 out of the well 18 and insert same into the jack 41 of the AV player 40. As a result, sound played by the AV player 40 can be amplified by the speakers 21.

The screen 42 is substantially at the same elevation as a magnifying lens 30 mounted on the opening 13. The magnifying lens 30 is thus capable of magnifying images shown on the screen 42 (see FIG. 7). Preferably, the magnifying lens 30 is formed of an optical glass of high refractive index, low dispersion because the formed magnifying lens 30 can be thinner and is anti-scratch. Also, a multi-layer anti-reflective coating is formed on either anti-scratch surface of the magnifying lens 30 so as to decrease light reflected across the magnifying lens 30 (e.g., less than 1%). An optimum curvature of the magnifying lens 30 is adapted to cause a TV-distortion less than 1% when FOV (field of view) is oblique about 30 mm to 50 mm relative to a horizontal line (see FIG. 8). The magnifying lens 30 has a focal length of about 150 mm to 200 mm. The magnifying lens 30 is capable of magnifying images shown on the screen 42 by 140% to 150% (i.e., magnifying 2.5" screen to 3.5" screen) when a distance between the magnifying lens 30 and the AV player 40 is in the range of 40 mm to 50 mm. Also preferably, the magnifying lens 30 is made of PMMA (polymethylmethacrylate) in an injection molding process so as to decrease weight and cost significantly. Also, distortion free images can be shown on the screen 42 by the magnifying lens 30 having a non-spherical shape. As compared the PMMA based magnifying lens 30 with the optical glass based one, the former has its thickness increased by 20%, has only 40% weight, and is less resistant to surface scratch. In brief, the invention not only can amplify sound but also can magnify pictures or video shown on the screen 42 of the AV player 40.

While the invention herein disclosed has been described by means of specific embodiments, numerous modifications and variations could be made thereto by those skilled in the art without departing from the scope and spirit of the invention set forth in the claims.

What is claimed is:

1. A portable device comprising:
   a body including a first member of L-section including an upper opening, an intermediate recess, a bottom battery compartment, and a cover for sealing the compartment, and a second member hingedly coupled to a rear of a horizontal portion of the first member, the second member including a top projection and a well;
   an audio/video (AV) player including a bottom slot adapted to receive the projection so as to upright fasten the AV player on the second member, a jack, and a screen;
   a speaker assembly including a pair of speakers provided in the recess;
   a plug adapted to receive in the well in an inoperative position and including a cable extended to connect to the speaker assembly, the plug being adapted to pull out of the well and insert into the jack; and
   a magnifying lens mounted on the opening and having an elevation substantially the same as the screen;
   wherein the magnifying lens is adapted to magnify images shown on the screen by about 140% to about 150% when a distance between the magnifying lens and the AV player is in the range of about 40 mm to about 50 mm with a TV-distortion less than 1%.

2. The device of claim 1, wherein the magnifying lens has a focal length of about 150 mm to about 200 mm.

3. The device of claim 1, wherein the magnifying lens is formed of an optical glass of high refractive index, low dispersion and is coated with a multi-layer of anti-reflective material.

4. The device of claim 1, wherein the magnifying lens is formed of PMMA (polymethylmethacrylate) in an injection molding process and has a non-spherical shape.

* * * * *